(12) United States Patent
Maguire

(10) Patent No.: US 8,033,875 B1
(45) Date of Patent: Oct. 11, 2011

(54) BATTERY TERMINAL WITH AN OPENING COAXIAL WITH OPENINGS IN A U-SHAPED TERMINAL CLAMP

(75) Inventor: Patrick Daniel Maguire, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/914,052

(22) Filed: Oct. 28, 2010

(51) Int. Cl.
*H01R 4/42* (2006.01)
(52) U.S. Cl. ...................................... 439/762
(58) Field of Classification Search ........... 439/762–767
See application file for complete search history.

(56) References Cited

U.S. PATENT DOCUMENTS

| | | | |
|---|---|---|---|
| 3,123,880 A * | 3/1964 | Barry et al. | 411/352 |
| 3,409,865 A * | 11/1968 | Shannon | 439/760 |
| 4,452,504 A | 6/1984 | Conrad et al. | |
| 5,221,219 A * | 6/1993 | Thomson | 439/762 |
| 5,306,091 A | 4/1994 | Zaydel et al. | |
| 5,713,707 A * | 2/1998 | Gagnon | 411/175 |
| 6,450,747 B1 * | 9/2002 | Fischer | 411/174 |
| 6,648,701 B2 * | 11/2003 | Mouissie | 439/761 |
| 6,854,946 B2 * | 2/2005 | Bauer | 411/523 |
| 7,029,787 B2 | 4/2006 | Bando et al. | |
| 7,465,135 B2 | 12/2008 | Fritsch | |
| 7,503,800 B2 | 3/2009 | Siglock et al. | |
| 7,878,745 B2 * | 2/2011 | Allen et al. | 411/175 |

\* cited by examiner

*Primary Examiner* — Chandrika Prasad
(74) *Attorney, Agent, or Firm* — David B. Kelley; Brooks Kushman P.C.

(57) ABSTRACT

A battery terminal connector including a pair of U-shaped terminal clamps and an intermediate portion connecting the terminal clamps. Each of the terminal clamps includes a pair of clamp portions between which an associated battery terminal is received. Furthermore, each of the clamp portions defines an opening to receive a fastener. The fastener secures the battery terminal connector to the associated battery terminal.

20 Claims, 3 Drawing Sheets

BATTERY TERMINAL WITH AN OPENING COAXIAL WITH OPENINGS IN A U-SHAPED TERMINAL CLAMP

BACKGROUND

1. Technical Field

Battery terminal connectors for connecting battery terminals.

2. Background Art

An electric vehicle (EV), a hybrid electric vehicle (HEV), and a fuel cell vehicle (FCV) generally include a high-voltage storage battery. In operation, the storage battery provides electric power to operate various components in the vehicle, such as an electric motor coupled to vehicle wheels.

The storage battery generally includes a plurality of electrochemical cells that can store electric charge. A group of electrochemical cells may comprise a module. The cells or modules may be expensive. Furthermore, the cells may have matched capacities in an array of cells in the battery.

A battery terminal connector or bus bar interconnects the cells or modules of the storage battery. Cells or modules having terminals with integrated threaded fasteners, such as a threaded post or nut, may become damaged or defective; e.g., during assembly of the storage battery. The damaged or defective terminal may require the cells or modules to be rejected and in need of replacement. Replacing the damaged or defective battery terminal during the assembly process is inefficient and/or expensive. Furthermore, special caution must be taken to ensure that the energy capacity of the replacement battery cell/module matches the energy capacity of cell/module having the damaged or defective battery terminal.

SUMMARY

A battery terminal connector is provided. The battery terminal connector includes a pair of U-shaped terminal clamps and an intermediate portion. The intermediate portion connects the terminal clamps. Each of the terminal clamps includes a pair of clamp portions between which an associated battery terminal is received. Each of the clamp portions defines an opening to receive a fastener to secure the battery terminal connector to the associated battery terminal.

DETAILED DESCRIPTION

Embodiments of the present disclosure include a battery terminal connector for connecting associated battery terminals.

Figure 1:
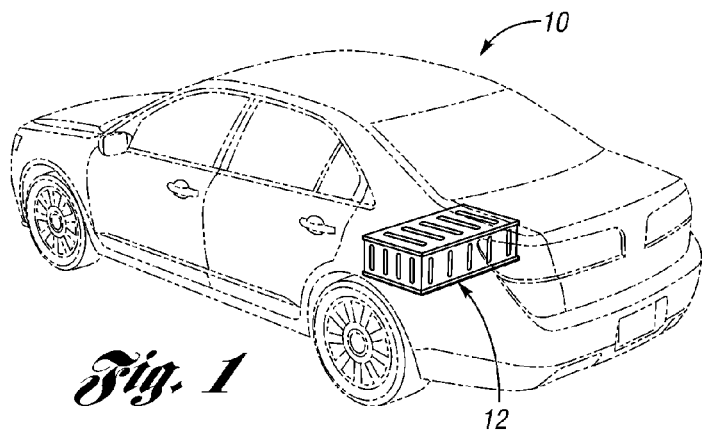
FIG. 1 is a schematic diagram illustrating an automotive vehicle including a storage battery with a plurality of electrochemical cells.

With reference to FIG. 1, an automotive vehicle 10 including a storage battery 12 with a plurality of electrochemical cells or modules 14 (shown in FIG. 2) is provided. The storage battery 12 may be within any type of automotive vehicle 10, such as an electric vehicle (EV), a hybrid electric vehicle (HEV), or a fuel cell vehicle (FCV).

Figure 2:
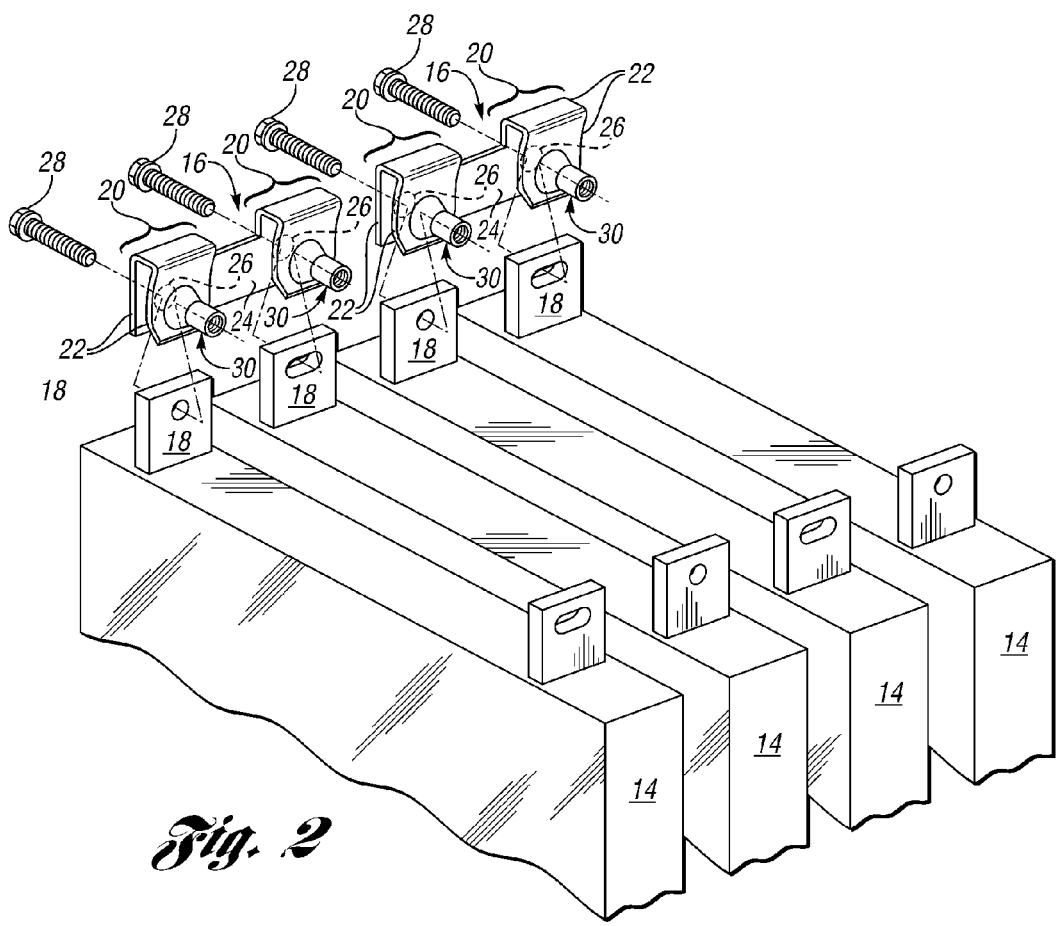
FIG. 2 is an exploded perspective view illustrating battery terminal connectors, fasteners, and associated battery terminals spaced apart from each other.

As illustrated in FIG. 2, a battery terminal connector 16 is provided for connecting associated battery terminals 18 of electrochemical cells or modules 14 in the storage battery 12. The storage battery 12 may be any type of storage battery with multiple electrochemical cells or modules 14, such as a high-voltage storage battery or traction battery used to propel the automotive vehicle 10. While the battery terminals 18 in FIG. 2 are shown as flat blade style terminals extending from the cells or modules 14, the battery terminals 18 may be any type of terminals that can be received by the battery terminal connector 16.

When the battery terminal connector 16 receives the associated battery terminals 18, the battery terminal connector 16 interconnects the cells or modules 14 in the storage battery 12. Electric current then may flow from one of the associated battery terminals 18 to the other associated battery terminal 18 through one of the battery terminal connectors 16.

As shown in FIG. 2, the battery terminal connector 16 includes a pair of U-shaped terminal clamps 20. Each of terminal clamps 20 has a generally U shape and includes a pair of clamp portions 22 between which the associated battery terminal 18 is received. For example, the pair of clamp portions 22 may receive the associated battery terminal 18 by inserting the pair of U-shaped terminal clamps 20 onto respective battery terminals 18. This may occur during assembly or repair of the storage battery 12. In addition to the pair of U-shaped terminal clamps 20, the battery terminal connector 16 includes an intermediate portion 24. The intermediate portion 24 connects the U-shaped terminal clamps 20 to provide an electrical connection between the U-shaped terminal clamps 20 of the pair.

With continuing reference to FIG. 2, each of the clamp portions 22 defines an opening 26. Each opening 26 is adapted to receive a fastener 28 for securing the battery terminal connector 16 to the associated battery terminal 18. Furthermore, at least one of the clamp portions 22 may include a threaded inner neck portion 30. The threaded inner neck portion 30 receives the fastener 28 and secures the clamp portions 22 on opposing sides of the battery terminal 18. Likewise, the fastener 28 may be a threaded fastener. For example, the threaded fastener may be a screw, bolt, threaded post, or other suitable threaded part to be received within the threaded inner neck portion 30 for securing the battery terminal connector 16 to the associated battery terminal 18.

Figure 3:
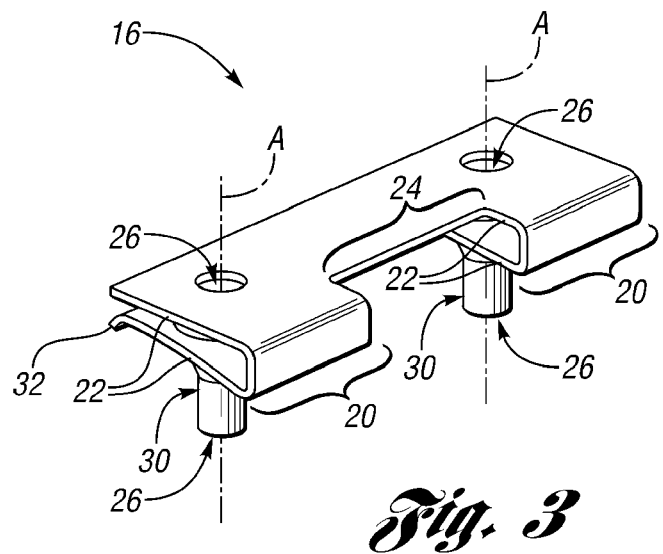
FIG. 3 is a perspective view illustrating one of the battery terminal connectors of FIG. 2 in accordance with one embodiment.

As illustrated in FIG. 3, the openings 26 in the pair of clamp portions 22 may be generally co-axially aligned along axis A to receive the fastener 28 through each of the openings 26 in the pair of clamp portions 22. Likewise, the openings 26 may be generally co-axially aligned openings in the pair of clamp portions 22. In addition, the clamp portions 22 in each pair of clamp portions 22 may extend toward each other in a spaced relationship to bias the associated battery terminal 18 when the associated battery terminal 18 has been received or inserted between the pair of clamp portions 22.

As depicted in FIG. 3, at least one of the clamp portions 22 may include a lip 32. The lip 32 can facilitate insertion of the associated battery terminal 18 between the U-shaped terminal clamps 20, which may occur during assembly or repair of the storage battery 12.

With continuing reference to FIG. 3, the battery terminal connector 16 may be a unitary one-piece body. Thus, for example, the pair of U-shaped terminal clamps 20 and the intermediate portion 24 may form the unitary one-piece body. Furthermore, the unitary one-piece body may be made from a conductive sheet metal, such as a steel alloy, stainless steel, aluminum, copper alloy, and nickel-plated copper. The battery terminal connector 16 may be from conductive sheet metal to facilitate electric current flow from one of the associated battery terminals 18, through the battery terminal connector 16, and to the other associated battery terminal 18 that is connected to the battery terminal connector 16. Thus, the pair of U-shaped terminal clamps 20 and the intermediate portion 24 may be made from conductive sheet metal to provide an electrical connection between the pair of U-shaped terminal clamps 20.

As shown in FIG. 3, the battery terminal connector 16 may comprise a stamping made from the conductive sheet metal including the pair of U-shaped terminal clamps 20. The conductive sheet metal may be stamped from a single sheet blank to form the unitary one-piece body. Punching the single sheet blank may be used to form one or more of the openings 26 defined in the U-shaped terminal clamp 20. Furthermore, the single sheet blank may be bent or folded to form the pair of clamp portions 22 as well as the generally U shape of U-shaped terminal clamps 20.

Figure 4:
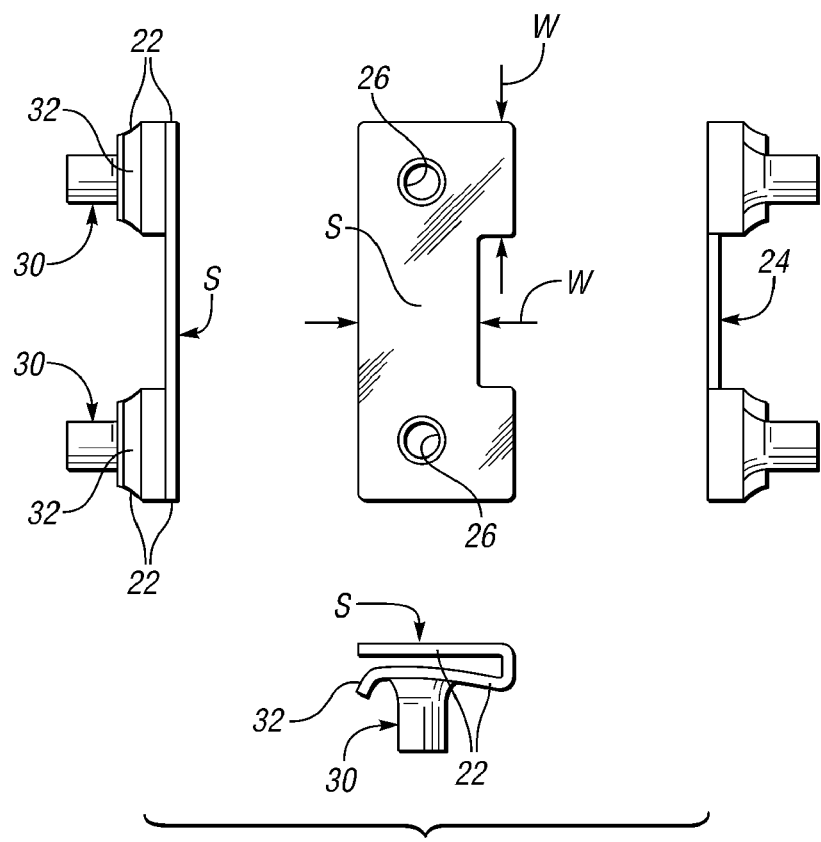
FIG. 4 provides elevational views illustrating the battery terminal connector in accordance with one embodiment.

Referring to FIG. 4, the intermediate portion 24 and the pair of clamp portions 22 may have a common width W. The common width W may facilitate uniform power or current flow between the pair of U-shaped terminal clamps 20. In addition, the pair of U-shaped terminal clamps 20 and the intermediate portion 24 may have a generally planar surface S to facilitate alignment of corresponding battery terminals 18. The intermediate portion 24 may also a bend to absorb movement and/or relieve load transfer between different battery terminals 18. For example, the generally planar surface S may be drawn flat against outer surfaces of the corresponding battery terminals 18 to facilitate alignment of corresponding battery terminals 18.

Figure 5:
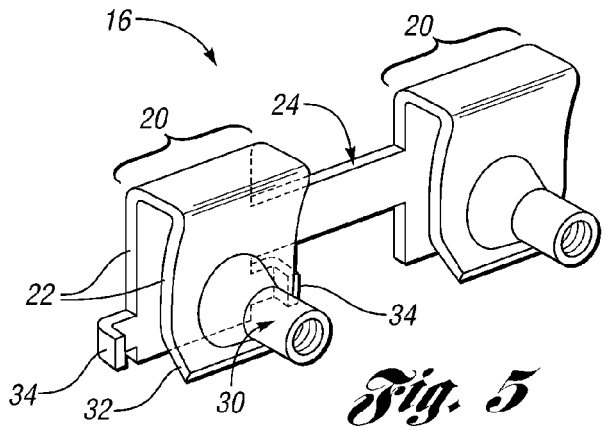
FIG. 5 is a perspective view illustrating the battery terminal connector with one of the terminal clamps having a pair of flanges in accordance with one embodiment.
Figure 6:
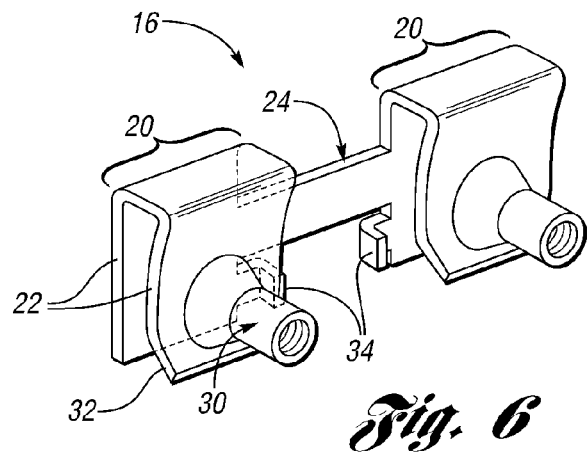
FIG. 6 is a perspective view illustrating the battery terminal connector with each of the terminal clamps having a flange in accordance with one embodiment.

With reference to FIGS. 5-6, at least one of the U-shaped terminal clamps 20 may include one or more flanges 34. Furthermore, each of the U-shaped terminal clamps 20 may have one of clamp portions 22 including the flange 34 and the other clamp portion 22 with the threaded inner neck portion 30. The flange 34 can facilitate alignment between the pair of clamp portions 22 and the associated battery terminal 18. Furthermore, the flange 34 can facilitate alignment between adjacent battery terminals 18, such as during assembly or repair of the storage battery 12. Also, the flange 34 may facilitate spacing between adjacent battery terminals 18.

While the flanges 34 in FIGS. 5-6 are shown as bent tabs, the flanges 34 may be any projecting edge or guide to facilitate alignment between the pair of clamp portions 22 and the associated battery terminal 18.

As shown in FIG. 5, at least one of the U-shaped terminal clamps 20 may include a pair of flanges 34. The associated battery terminal 18 may be received inserted or received between the pair of clamp portions 22 and the pair of flanges 34 on the U-shaped terminal clamp 20.

As shown in FIG. 6, each of the U-shaped terminal clamps 20 may include a flange 34 to facilitate alignment with adjacent battery terminals 18. Each of the flanges 34 of FIG. 6 are between the U-shaped terminal clamps 20. The battery terminal connector 16 may be symmetrically shaped about the center of the intermediate portion 24 when the flanges 34 or bent tabs between the U-shaped terminal clamps 20 are located as shown in FIG. 6.

Figure 7:
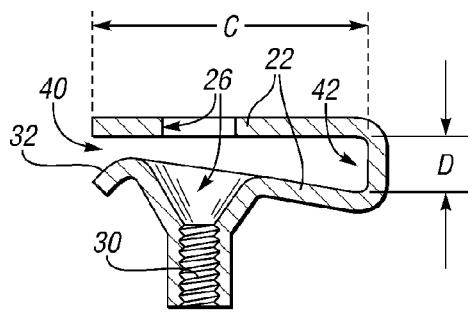
FIG. 7 is a cross-sectional view of one of the terminal clamps of the battery terminal connector defining generally co-axially aligned openings in accordance with one embodiment.

As illustrated in FIG. 7, each pair of clamp portions 22 defines a mouth opening 40 and a base opening 42. The mouth opening 40 is adapted to receive an associated battery terminal 18. The base opening 42 is on a side of the pair of clamp portions 22 opposite the mouth opening 40 and is between the pair of clamp portions 22, as shown in FIG. 7.

As shown in FIG. 7, the pair of clamp portions 22 may define a distance D in the base opening 42 between the pair of clamp portions 22. The distance D may be larger than the distance between the pair of clamp portions 22 in the mouth opening 40 to facilitate insertion of the associated battery terminal 18 between the U-shaped terminal clamps 20. For example, the distance D may be between 0.1 and 0.4 millimeters (0.1-0.4 mm) greater than the smallest distance between the pair of clamp portions 22 in the mouth opening 40.

Referring again to FIG. 7, each of the U-shaped terminal clamps 20 may define a predetermined channel depth C within the clamp portions 22. The predetermined channel depth C can facilitate alignment between the openings 26 in the clamp portions 22 and openings in the associated battery terminal 18. More specifically, the channel depth C may adapted to receive the associated battery terminal 18, such that the openings 26 in the clamp portions 22 generally align with the openings in the associated battery terminal 18 when the associated battery terminal 18 is fully inserted to contact the portion of the base opening 42 that defines distance D.

Figure 8:
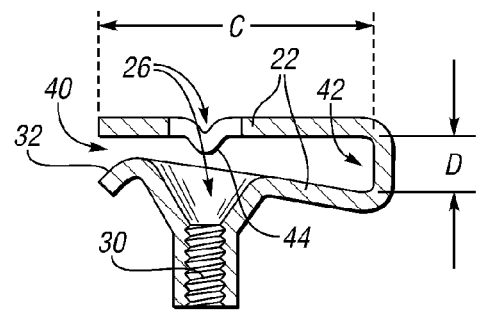
FIG. 8 is a cross-sectional view similar to FIG. 7, but illustrating the terminal clamp including a detent in accordance with one embodiment.

As illustrated in FIG. 8, at least one of the clamp portions 22 may include a detent 44. The detent 44 may be disposed on one of clamp portions 22 that is opposite the clamp portion 22 having the threaded inner neck portion 30. During joining of the battery terminal connector 16 and associated battery terminals 18, the detent 44 can facilitate alignment between the associated battery terminal 18 and the openings 26 in the clamp portions 22. In addition, the detent 44 may project toward the threaded inner neck portion 30 to facilitate rotational insertion of the fastener 28 through the openings 26 in the clamp portions 22 for securing the battery terminal connector 16 to the associated battery terminal 18.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A battery terminal connector comprising:
a pair of U-shaped terminal clamps each of which includes
a pair of clamp portions between which an associated battery terminal with an opening is received; and
an intermediate portion connecting the clamps;
each of the clamp portions defining an opening adapted to coaxially align with the opening in the associated battery terminal and receive a fastener coaxially through the opening in the clamp portions as well as the opening in the associated battery terminal to secure the battery terminal connector to the associated battery terminal, and the pair of clamp portions further defining a mouth opening, the mouth opening of each the U-shaped terminal clamps being on a common side of the battery terminal connector.

2. The battery terminal connector of claim 1 wherein the openings are generally co-axially aligned openings in the pair of clamp portions.

3. The battery terminal connector of claim 1 wherein the clamp portions and the intermediate portion define a common width to facilitate uniform power flow between the pair of U-shaped terminal clamps.

4. The battery terminal connector of claim 1 wherein the clamp portions in each pair of clamp portions extend toward each other to bias the associated battery terminal between the pair of clamp portions.

5. The battery terminal connector of claim 1 wherein at least one of the clamp portions includes a threaded inner neck portion to receive the fastener and secure the clamp portions on opposing sides of the battery terminal.

6. The battery terminal connector of claim 1 wherein each pair of clamp portions defines a base opening between the pair of clamp portions on a side of the pair of clamp portions opposite the mouth opening, and a distance between the pair of clamp portions in the base opening being larger than distance between the pair of clamp portions in the mouth opening to facilitate insertion of the associated battery terminal between the U-shaped terminal clamps.

7. The battery terminal connector of claim 1 wherein at least one of the clamp portions includes a lip to facilitate insertion of the associated battery terminal between the U-shaped terminal clamps.

8. The battery terminal connector of claim 1 wherein at least one of the clamp portions includes a detent to facilitate alignment between the associated battery terminal and the openings in the clamp portions.

9. The battery terminal connector of claim 1 wherein the pair of clamp portions includes a threaded inner neck portion on one of the clamp portions and a detent on another one of clamp portions to facilitate alignment between an opening in the associated battery terminal and the opening in the clamp portion including the threaded inner neck portion.

10. The battery terminal connector of claim 1 wherein the pair of U-shaped terminal clamps and the intermediate portion are made from conductive sheet metal to provide an electrical connection between the pair of U-shaped terminal clamps.

11. The battery terminal connector of claim 10 wherein the pair of U-shaped terminal clamps and the intermediate portion form a unitary one-piece body stamped from the conductive sheet metal.

12. The battery terminal connector of claim 1 wherein the pair of U-shaped terminal clamps and the intermediate portion define a generally planar surface to facilitate alignment of corresponding battery terminals.

13. The battery terminal connector of claim 1 wherein each of the U-shaped terminal clamps define a predetermined channel depth within the clamp portions to facilitate alignment between the openings in the clamp portions and the associated battery terminal.

14. The battery terminal connector of claim 1 wherein at least one of the U-shaped terminal clamps includes a flange to facilitate alignment between the pair of clamp portions and the associated battery terminal.

15. The battery terminal connector of claim 1 wherein at least one of the U-shaped terminal clamps includes a pair of flanges between which the associated battery terminal is received.

16. The battery terminal connector of claim 1 wherein each of the U-shaped terminal clamps includes a flange to facilitate alignment between adjacent battery terminals.

17. The battery terminal connector of claim 1 wherein each of the U-shaped terminal clamps includes a threaded inner neck portion on one of the clamp portions and a flange on another one of clamp portions to facilitate alignment between adjacent battery terminals.

18. The battery terminal connector of claim 17 wherein each of the flanges are between the U-shaped terminal clamps.

19. A battery terminal connector comprising:
a pair of terminal clamps each of which has a generally U shape including a pair of clamp portions defining co-axial openings to receive a fastener and the pair of clamp portions being spaced to receive an associated battery terminal with an opening;
an intermediate portion connecting the terminal clamps; and
at least one of the clamp portions defining a threaded inner neck portion for receiving the fastener coaxially through the opening in the clamp portions as well as the opening in the associated battery terminal to secure the clamp portions on opposing sides of the associated battery terminal, and the pair of clamp portions further defining a mouth opening, the mouth opening of each the U-shaped terminal clamps being on a common side of the battery terminal connector.

20. A battery terminal connector comprising:
a stamping made from conductive sheet metal including a pair of U-shaped terminal clamps each of which includes a pair of clamp portions between which an associated battery terminal with an opening is received and an intermediate portion connecting the clamps to provide an electrical connection between the pair of U-shaped terminal clamps; and
each of the clamp portions defining a generally co-axially aligned opening adapted to coaxially align with the opening in the associated battery terminal and receive a fastener coaxially through the opening in the clamp portions as well as the opening in the associated battery terminal to secure the clamp portions on opposing sides of the associated battery terminal, and the pair of clamp portions further defining a mouth opening, the mouth opening of each the U-shaped terminal clamps being on a common side of the battery terminal connector.

\* \* \* \* \*